US007396881B2

(12) United States Patent
Lustiger et al.

(10) Patent No.: US 7,396,881 B2
(45) Date of Patent: Jul. 8, 2008

(54) POLYETHYLENE COMPOSITIONS FOR ROTATIONAL MOLDING

(75) Inventors: Arnold Lustiger, Edison, NJ (US); David John Lohse, Bridgewater, NJ (US); Blair A. Graham, Bright's Grove (CA); Ronald Cooke, Sarnia (CA)

(73) Assignee: ExxonMobil Chemical Patents Inc., Houston, TX (US)

( * ) Notice: Subject to any disclaimer, the term of this patent is extended or adjusted under 35 U.S.C. 154(b) by 368 days.

(21) Appl. No.: 11/186,443

(22) Filed: Jul. 21, 2005

(65) Prior Publication Data

US 2005/0256266 A1 Nov. 17, 2005

Related U.S. Application Data

(63) Continuation-in-part of application No. 11/078,320, filed on Mar. 14, 2005, now Pat. No. 7,307,126, which is a continuation of application No. 10/666,710, filed on Sep. 18, 2003, now Pat. No. 6,969,741.

(60) Provisional application No. 60/414,952, filed on Oct. 1, 2002, provisional application No. 60/424,535, filed on Nov. 7, 2002.

(51) Int. Cl.
*C08L 23/04* (2006.01)
*B28B 1/28* (2006.01)

(52) U.S. Cl. .................. 525/240; 264/310; 264/311; 264/312

(58) Field of Classification Search .................. 525/240; 264/310, 311, 312
See application file for complete search history.

(56) References Cited

U.S. PATENT DOCUMENTS

| | | | |
|---|---|---|---|
| 4,330,639 A | 5/1982 | Matsuura et al. |
| 4,335,224 A | 6/1982 | Matsuura et al. |
| 4,336,352 A | 6/1982 | Sakurai et al. |
| 4,429,079 A | 1/1984 | Shibata et al. |
| 4,438,238 A | 3/1984 | Fukushima et al. |
| 4,461,873 A | 7/1984 | Bailey et al. |
| 4,536,550 A | 8/1985 | Moriguchi et al. |
| 4,547,551 A | 10/1985 | Bailey et al. |
| 4,577,768 A | 3/1986 | Go et al. |
| 4,705,829 A | 11/1987 | Kwack et al. |
| 4,770,912 A | 9/1988 | Furrer et al. |
| 4,786,688 A | 11/1988 | Thiersault et al. |
| 4,792,588 A | 12/1988 | Suga et al. |
| 4,835,219 A | 5/1989 | Tajima et al. |
| 5,015,511 A | 5/1991 | Treybig et al. |
| 5,082,902 A | 1/1992 | Gurevitch et al. |
| 5,189,106 A | 2/1993 | Morimoto et al. |
| 5,260,384 A | 11/1993 | Morimoto et al. |
| 5,306,775 A | 4/1994 | Martin et al. |
| 5,319,029 A | 6/1994 | Martin et al. |
| 5,346,732 A | 9/1994 | Lai et al. |
| 5,380,803 A | 1/1995 | Coutant et al. |
| 5,382,630 A | 1/1995 | Stehling et al. |
| 5,382,631 A | 1/1995 | Stehling et al. |
| 5,405,901 A | 4/1995 | Daniell et al. |
| 5,519,091 A | 5/1996 | Tsutsui et al. |
| 5,530,055 A * | 6/1996 | Needham .................. 524/528 |
| 5,589,128 A | 12/1996 | Lai et al. |
| 5,605,969 A | 2/1997 | Tsutsui et al. |
| 5,705,110 A | 1/1998 | Weber |
| 5,858,491 A | 1/1999 | Geussens et al. |
| 6,111,023 A | 8/2000 | Chum et al. |
| 6,136,924 A | 10/2000 | Promel |
| 6,162,871 A | 12/2000 | Watanabe et al. |
| 6,225,421 B1 | 5/2001 | Promel et al. |
| 6,362,270 B1 | 3/2002 | Chaudhary et al. |
| 6,806,338 B2 | 10/2004 | Baann et al. |
| 6,969,741 B2 * | 11/2005 | Lustiger et al. .............. 525/240 |
| 7,022,770 B2 * | 4/2006 | Lustiger et al. .............. 525/191 |

FOREIGN PATENT DOCUMENTS

| | | |
|---|---|---|
| AU | 19992 1280 | 9/1999 |
| EP | 423 962 A2 | 4/1991 |
| EP | 1 201 711 A1 | 5/2002 |
| EP | 1 236 770 A1 | 9/2002 |
| EP | 1 304 353 | 4/2003 |
| JP | 2001-89615 | 5/2001 |
| WO | WO 00/71615 | 11/2000 |
| WO | WO 01/96419 | 12/2001 |
| WO | WO 02/48258 A2 | 6/2002 |
| WO | WO 2004/031293 | 3/2004 |

OTHER PUBLICATIONS

Dodge, Philip T., "Rotantional Molding," *Encyclopedia of Polymer Science and Engineering*, vol. 14, pp. 659-670, 1990.
Elvers, Barbara, et al., "Injection Molding," *Ullman's Encyclopedia of Industrial Chemistry*, vol. A20, pp. 688-696, 1992.
Fair, R. L., "Rotational Molding," *Modern Plastics Mid-October Encyclopedia*, vol. 66, No. 11, pp. 317-318, McGraw-Hill, Inc., 1990.

* cited by examiner

Primary Examiner—Roberto Rábago

(57) ABSTRACT

Polyethylene blend compositions suitable for rotomolding, rotomolded articles, and processes for rotomolding articles are provided. The polyethylene compositions include a first polyethylene having a melt index of 0.4 to 3.0 g/10 min and a density of from 0.910 to 0.930 g/cm$^3$; and a second polyethylene having a melt index of 10 to 30 g/10 min and a density of 0.945 to 0.975 g/cm$^3$. The composition has a density of from 0.930 to 0.955 g/cm$^3$ and a melt index of 1.5 to 12 g/10 min, and the first and second polyethylenes differ in density by from 0.030 to 0.048 g/cm$^3$. These compositions exhibit improved physical properties, such as Environmental Stress Crack Resistance and Izod Impact Strength. Articles produced from the compositions may also exhibit improved impact resistance properties, enhanced ductile break properties, and improved deflection resistance, which represents a combination of creep and fatigue resistance.

40 Claims, 10 Drawing Sheets

POLYETHYLENE COMPOSITIONS FOR ROTATIONAL MOLDING

CROSS-REFERENCE TO RELATED APPLICATIONS

The present application is a continuation-in-part of and claims the benefit of U.S. patent application Ser. No. 11/078,320, filed Mar. 14, 2005, now U.S. Pat. No. 7,307,126, which is a continuation of and claims the benefit of U.S. patent application Ser. No. 10/666,710, filed Sep. 18, 2003, now U.S. Pat. No. 6,969,741, which claims the benefit of U.S. Provisional Applications No. 60/414,952, filed Oct. 1, 2002 and 60/424,535, filed Nov. 7, 2002, said applications incorporated herein by reference.

FIELD OF THE INVENTION

This invention relates to thermoplastic compositions of polyethylene polymers suitable for fabrication into useful products by rotational molding.

BACKGROUND OF THE INVENTION

Rotational molding or rotational casting, more commonly known as rotomolding, is widely used for molding hollow articles, and can be used to mold both small and large containers, such as tanks of typically 19 L to 57,000 L. Such rotomolded tanks are utilized in agricultural, chemical and recreational vehicle industries. Rotomolded containers are used for packaging and material handling, particularly as container articles for fluids or solids. Rotational molding is also used for portable toilets, instrument and battery cases, light globes, vacuum cleaner and scrubber housings, toys, and garbage containers. The process is relatively less expensive and easy to use for polymer processing than other known means and has been increasing in use.

To rotomold a part, polymeric resin, usually in powder form, is charged inside a mold shell, which is then, typically, rotated on two axes and heated to cause the melting resin to adhere to the inside of the mold. After sufficient heating time, the mold is moved to a cooling chamber, and after cooling, the molded part is removed to begin another molding cycle. More detailed discussion of rotomolding may be found in Modem Plastics Encyclopedia, 1990, pp. 317-318, and in Encyclopedia of Polymer Science and Engineering, pp. 659-670, J. Wiley & Sons, 1990.

Rotational molding primarily uses polyolefin resins, with thermoplastic polymers of ethylene being principally used. Key properties for rotomolded parts include appearance, and especially in the case of containers, resistance to puncture or rupture, chemical resistance and for extended periods of usefulness, resistance to environmental stress cracking. Low density polyethylene (LDPE) with a density of about 0.900 to about 0.925 g/cm$^3$, linear low density polyethylene (LLDPE) with a density of about 0.926 to about 0.940 g/cm$^3$, and high density polyethylene (HDPE) with a density of about 0.940 to about 0.960 g/cm$^3$ are used in rotomolding applications. LLDPE is said to be preferred for its excellent low temperature impact strength and good environmental stress crack resistance ("ESCR").

Compositions of polyethylene resins have been proposed to improve physical properties, including impact strength, environmental stress crack resistance, and chemical resistance. U.S. Pat. No. 4,438,238 describes blends for extrusion processing, injection molding and films where a combination of two ethylene-α-olefin copolymers with different densities, intrinsic viscosities and number of short chain branching per 1,000 carbon atoms is attributed with such physical properties. U.S. Pat. No. 4,461,873 describes ethylene polymer blends of a high molecular weight ethylene polymer, preferably a copolymer, and a low molecular weight ethylene polymer, preferably an ethylene homopolymer, for improved film properties and environmental stress crack resistance useful in the manufacture of film or in blow molding techniques, the production of pipes and wire coating. EP 0 423 962 describes ethylene polymer compositions particularly suitable for gas pipes said to have improved environmental stress cracking resistance comprising two or more kinds of ethylene polymers different in average molecular weight, at least one of which is a high molecular weight ethylene polymer having an intrinsic viscosity of 4.5 to 10.0 dl/g in decalin at 135° C. and a density of 0.910 to 0.930 g/cm$^3$ and another of which is a low molecular weight ethylene polymer having an intrinsic viscosity of 0.5 to 2.0 dl/g, as determined for the first polymer, and a density of 0.938 to 0.970 g/cm$^3$.

U.S. Pat. No. 5,082,902 describes blends of linear polyethylenes for injection and rotational molding said to have reduced crystallization times with improved impact strength and ESCR. The blends comprise: (a) a first polymer having a density of from 0.85 to 0.95 g/cm$^3$ and an MI of 1 to 200 g/10 min and (b) a second polymer having a density of 0.015 to 0.15 g/cm$^3$ greater than the density of the first polymer and an MI differing by no more that 50% from the MI of the first polymer. U.S. Pat. No. 5,306,775 describes polyethylene blends said to have a balance of properties for processing by any of the known thermoplastic processes, specifically including improved environmental stress crack resistance. These compositions have: (a) low molecular weight ethylene resins made using a chromium oxide based catalyst and having a density at least 0.955 g/cm$^3$ and melt index (MI) between 25 and 400 g/10 min and (b) high molecular weight ethylene copolymer resins with a density not higher than 0.955 g/cm$^3$ and a high load melt index (HLMI) between 0.1 and 50 g/10 min.

U.S. Pat. No. 5,382,631 describes linear interpolymer polyethylene blends having narrow molecular weight distribution ($M_w/M_n \leq 3$) and/or composition distribution (CDBI) less than 50%, where the blends are generally free of fractions having higher molecular weight and lower average comonomer contents than other blend components. Improved properties for films, fibers, coatings, and molded articles are attributed to these blends. In one example, a first component is an ethylene-butene copolymer with a density of 0.9042 g/cm$^3$, $M_w/M_n$ of 2.3, and an MI of 4.0 dg/min and a second component is an HDPE with a density of 0.9552 g/cm$^3$, $M_w/M_n$ of 2.8, and an MI of 5.0 dg/min. The blend is said to have improved tear strength characteristics.

U.S. Pat. No. 6,362,270 describes thermoplastic compositions said to be especially suited to rotomolding applications comprising: (a) a majority component that may be an ethylene interpolymer having a density greater than 0.915 g/cm$^3$ and preferably a melt index of from about 2 to 500 g/10 min and (b) an impact additive that may be an ethylene interpolymer having a density less than 0.915 g/cm$^3$ and melt index preferably greater than 0.05 g/10 min and less than 100 g/10 min. Improved physical properties as ascribed to these compositions include improved impact strength and good ESCR.

There is a continuing need for polyethylene-based compositions of improved environmental stress crack resistance and impact strength, particularly for those that are suitable for rotomolding applications.

SUMMARY OF THE INVENTION

In accordance with the present invention, polyolefin-based blend compositions suitable for rotomolding, rotomolded articles, and processes for rotomolding articles are provided.

In one embodiment, the invention provides a polyethylene composition including a first polyethylene having a melt index of 0.4 to 3.0 g/10 min and a density of from 0.910 to 0.930 g/cm$^3$; and a second polyethylene having a melt index of 10 to 30 g/10 min and a density of 0.945 to 0.975 g/cm$^3$, wherein the composition has a density of from 0.930 to 0.955 g/cm$^3$ and a melt index of 1.5 to 12 g/10 min, and wherein the first and second polyethylenes differ in density by from 0.030 to 0.048 g/cm$^3$.

In another embodiment, the invention provides a polyethylene composition including a first metallocene-catalyzed polyethylene having a melt index of 0.4 to 3.0 g/10 min and a density of from 0.910 to 0.930 g/cm$^3$; and a second metallocene-catalyzed polyethylene having a melt index of 10 to 30 g/10 min and a density of 0.945 to 0.975 g/cm$^3$, wherein the composition has a density of from 0.930 to 0.955 g/cm$^3$ and a melt index of 1.5 to 12 g/10 min, and wherein the first and second polyethylenes differ in density by from 0.030 to 0.048 g/cm$^3$.

In another embodiment, the invention provides a rotomolded article formed from or including a polyethylene composition, the polyethylene composition including a first polyethylene having a melt index of 0.4 to 3.0 g/10 min and a density of from 0.910 to 0.930 g/cm$^3$; and a second polyethylene having a melt index of 10 to 30 g/10 min and a density of 0.945 to 0.975 g/cm$^3$, wherein the composition has a density of from 0.930 to 0.955 g/cm$^3$ and a melt index of 1.5 to 12 g/10 min, and wherein the first and second polyethylenes differ in density by from 0.030 to 0.048 g/cm$^3$.

In another embodiment, the invention provides a rotomolded article formed from or including a polyethylene composition, the polyethylene composition including a first metallocene-catalyzed polyethylene having a melt index of 0.4 to 3.0 g/10 min and a density of from 0.910 to 0.930 g/cm$^3$, and a second metallocene-catalyzed polyethylene having a melt index of 10 to 30 g/10 min and a density of 0.945 to 0.975 g/cm$^3$, wherein the composition has a density of from 0.930 to 0.955 g/cm$^3$ and a melt index of 1.5 to 12 g/10 min, and wherein the first and second polyethylenes differ in density by from 0.030 to 0.048 g/cm$^3$.

In another embodiment, the invention provides a process for forming a rotomolded article, the process carried out by: (a) providing a polyethylene composition, the polyethylene composition including a first polyethylene having a melt index of 0.4 to 3.0 g/10 min and a density of from 0.910 to 0.930 g/cm$^3$; and a second polyethylene having a melt index of 10 to 30 g/10 min and a density of 0.945 to 0.975 g/cm$^3$, wherein the composition has a density of from 0.930 to 0.955 g/cm$^3$ and a melt index of 1.5 to 12 g/10 min, and wherein the first and second polyethylenes differ in density by from 0.030 to 0.048 g/cm$^3$; and (b) rotomolding the composition to form a rotomolded article.

In another embodiment, the invention provides a process for forming a rotomolded article, the process carried out by: (a) providing a polyethylene composition, the polyethylene composition including a first metallocene-catalyzed polyethylene having a melt index of 0.4 to 3.0 g/10 min and a density of from 0.910 to 0.930 g/cm$^3$, and a second metallocene catalyzed polyethylene having a melt index of 10 to 30 g/10 min and a density of 0.945 to 0.975 g/cm$^3$, wherein the composition has a density of from 0.930 to 0.955 g/cm$^3$ and a melt index of 1.5 to 12 g/10 min, and wherein the first and second polyethylenes differ in density by from 0.030 to 0.048 g/cm$^3$; and (b) rotomolding the composition to form a rotomolded article.

In another embodiment, the invention provides a polyethylene composition, a rotomolded article, or a process of forming a rotomolded article, in accordance with any of the preceding embodiments, except that each of the first and second polyethylenes has an Mw/Mn ratio of from 2 to 4.

In another embodiment, the invention provides a polyethylene composition, a rotomolded article, or a process of forming a rotomolded article, in accordance with any of the preceding embodiments, except that each of the first and second polyethylenes has an Mw/Mn ratio of from 2 to 3.5.

In another embodiment, the invention provides a polyethylene composition, a rotomolded article, or a process of forming a rotomolded article, in accordance with any of the preceding embodiments, except that the first polyethylene has a density of from 0.911 to 0.926 g/cm$^3$.

In another embodiment, the invention provides a polyethylene composition, a rotomolded article, or a process of forming a rotomolded article, in accordance with any of the preceding embodiments, except that the second polyethylene has a density of from 0.950 to 0.970 g/cm$^3$.

In another embodiment, the invention provides a polyethylene composition, a rotomolded article, or a process of forming a rotomolded article, in accordance with any of the preceding embodiments, except that the second polyethylene has a density of from 0.955 to 0.965 g/cm$^3$.

In another embodiment, the invention provides a polyethylene composition, a rotomolded article, or a process of forming a rotomolded article, in accordance with any of the preceding embodiments, except that the composition has a density of from 0.932 to 0.950 g/cm$^3$.

In another embodiment, the invention provides a polyethylene composition, a rotomolded article, or a process of forming a rotomolded article, in accordance with any of the preceding embodiments, except that the composition has a density of from 0.935 to 0.945 g/cm$^3$.

In another embodiment, the invention provides a polyethylene composition, a rotomolded article, or a process of forming a rotomolded article, in accordance with any of the preceding embodiments, except that the first and second polyethylenes differ in density by from 0.032 to 0.045 g/cm$^3$.

In another embodiment, the invention provides a polyethylene composition, a rotomolded article, or a process of forming a rotomolded article, in accordance with any of the preceding embodiments, except that the first and second polyethylenes differ in density by from 0.035 to 0.042 g/cm$^3$.

In another embodiment, the invention provides a polyethylene composition, a rotomolded article, or a process of forming a rotomolded article, in accordance with any of the preceding embodiments, except that the composition has a melt index $I_{2.16}$ of from 2 to 10 g/10 min.

In another embodiment, the invention provides a polyethylene composition, a rotomolded article, or a process of forming a rotomolded article, in accordance with any of the preceding embodiments, wherein the blend includes 80% to 20% by weight of the first polyethylene and 20% to 80% by weight of the second polyethylene, based on the total weight of the first and second polyethylenes.

In another embodiment, the invention provides a polyethylene composition, a rotomolded article, or a process of forming a rotomolded article, in accordance with any of the preceding embodiments, wherein the blend includes 65% to 35% by weight of the first polyethylene and 35% to 65% by weight of the second polyethylene, based on the total weight of the first and second polyethylenes.

In another embodiment, the invention provides a polyethylene composition, a rotomolded article, or a process of forming a rotomolded article, in accordance with any of the preceding embodiments, wherein the blend includes 55% to 45% by weight of the first polyethylene and 45% to 55% by weight of the second polyethylene, based on the total weight of the first and second polyethylenes.

In another embodiment, the invention provides a polyethylene composition, a rotomolded article, or a process of forming a rotomolded article, in accordance with any of the preceding embodiments, wherein the composition has an ESCR value of at least 250 hr.

In another embodiment, the invention provides a polyethylene composition, a rotomolded article, or a process of forming a rotomolded article, in accordance with any of the preceding embodiments, wherein the composition has an ESCR value of at least 500 hr.

In another embodiment, the invention provides a polyethylene composition, a rotomolded article, or a process of forming a rotomolded article, in accordance with any of the preceding embodiments, wherein the composition has an ESCR value of at least 750 hr.

In another embodiment, the invention provides a polyethylene composition, a rotomolded article, or a process of forming a rotomolded article, in accordance with any of the preceding embodiments, wherein the composition has an ESCR value of at least 1000 hr.

In another embodiment, the invention provides a polyethylene composition, a rotomolded article, or a process of forming a rotomolded article, in accordance with any of the preceding embodiments, wherein the composition has an Izod impact strength of at least 120 J/m, for a 3.17 mm sample at $-40°$ C.

In another embodiment, the invention provides a rotomolded article wherein the article has an ARM impact value of at least 120 ft-lbs when the article is produced in a rotomolding process at a cook time of 14 minutes to 18 minutes at about 250° C. to about 350° C. with part thickness around 0.2 inch to 0.5 inch.

In another embodiment, the invention provides a polyethylene composition, a rotomolded article, or a process of forming a rotomolded article in accordance with any of the preceding embodiments, wherein the composition has a deflection of less than 0.8 cm after 20,000 cycles.

In another embodiment, the invention provides a polyethylene composition, a rotomolded article, or a process of forming a rotomolded article, in accordance with any of the preceding embodiments, wherein at least one of the first and second polyethylenes is a blend of two or more polyethylene resins.

In another embodiment, the invention provides a polyethylene composition, a rotomolded article, or a process of forming a rotomolded article, in accordance with any of the preceding embodiments except the immediately preceding embodiment, wherein the composition includes only the first and second polyethylenes, except that minor amounts of conventional additives can also be present.

DETAILED DESCRIPTION OF THE INVENTION

Figure 1:
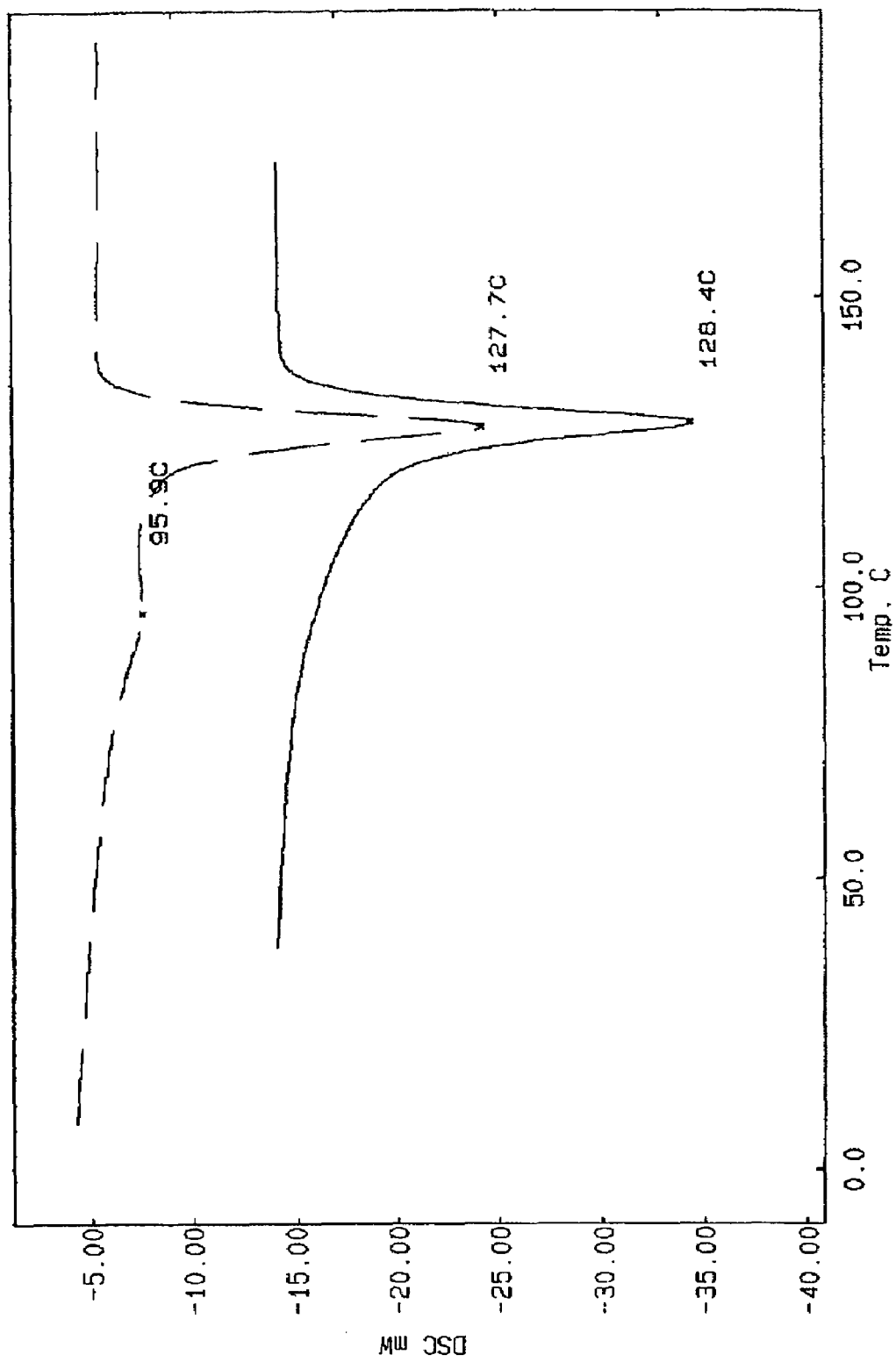
FIG. 1 is a Differential Scanning Calorimetry (DSC) display of the polymer melting temperature of two blend compositions. The solid line represents a blend according to the invention (3a-b in Table 1) and the broken line represents a Comparative blend (5a-b in Table 1).

As indicated above, previous work has often centered on film and blow molding applications. Thus, prior studies were often directed to film clarity, puncture resistance and processing characteristics for film processing, such extrusion and blown film processes. ESCR improvement was also often addressed for the use of blended polyethylenes for such applications, especially in blow molding applications. However, the prior art fails to provide polyethylene blend compositions for the specialized technology and particular product requirements of rotomolding. The inventive compositions surprisingly and advantageously provide improved ESCR and significantly improved IZOD impact properties, enhancing the overall value of the invention compositions.

By preparing several samples of proposed blend polyethylene components and then subjecting blends prepared from them to analytical testing, it was determined that peak values of ESCR are obtained when the difference in density and melt index ($I_{2.16}$) of the blend components were within specific ranges, as described herein. At smaller density differences for the two components, ESCR was improved over single component compositions, but was significantly deficient to those within the range for the inventive compositions. Increasing the width of the density range between the components within the invention range increased the ESCR improvement until a peak was reached in which ESCR no longer improved and began to diminish. Examining the melting peaks of the sample blends with a differential scanning calorimeter (DSC) helps illustrate the region in which ESCR improvements are no longer realized by increasing the difference in densities between the two components. This is shown by the point where by further increasing the width of the density range, the two components no longer completely cocrystallize, as evidenced by the presence of a secondary lower melting peak in the DSC scan. When the density range was wider than that described above, evidence of loss of cocrystallizability became apparent as a second melting peak or shoulder began to appear in the scans. The blends exhibiting even minimal incidence of a second shoulder had diminished ESCR improvements. See FIG. 1, and TABLE 1.

The first polyethylene of the polymer blends of the invention is a linear low density polyethylene copolymer derived from the coordination polymerization of principally ethylene with a minor amount of one or more copolymerizable monomers. Particularly improved end-product properties are obtained using such copolymers having a narrow molecular weight distribution (Mw/Mn, or "MWD"), e.g., Mw/Mn of from a lower limit of 2.0 to an upper limit of 4.0 or 3.5 or 3.0, with ranges from any lower limit to any upper limit being contemplated. Suitable comonomers include $C_3$-$C_{20}$ alpha-olefins, preferably $C_3$-$C_8$, $C_5$-$C_{20}$ cyclic olefins, preferably $C_7$-$C_{12}$ cyclic olefins, $C_7$-$C_{20}$ vinyl aromatic monomers, preferably styrene, and $C_4$-$C_{20}$ geminally disubstituted olefins, preferably isobutylene. The most preferred comonomers include propylene, 1-butene, 1-hexene, 4-methyl-1-pentene and 1-octene. The density of the copolymer is determined largely by comonomer content and typically ranges from 0.910 or 0.911 g/cm³ to 0.930 or 0.926 g/cm³, with ranges from any lower limit to any upper limit being contemplated. Some amount of long-chain branching may be present, but the density limitations are largely due to the presence of comonomer. These ethylene copolymers are of higher molecular weight than the second polyethylene of the blends, as shown by a melt index $I_{2.16}$ as measured according to ASTM D1238, condition 190° C., 2.16 kg (formerly condition "E"), of from about 0.4 to about 3.0 g/10 min. This molecular weight range is approximately equivalent to an intrinsic viscosity (in decalin at 135° C.) of from about 1.2 to about 1.7 dl/g.

The second polyethylene of the polymer blends of the invention is a high density polyethylene of similar Mw/Mn to the first polyethylene, i.e., Mw/Mn of from a lower limit of 2.0 to an upper limit of 4.0 or 3.5 or 3.0, with ranges from any lower limit to any upper limit being contemplated, but with lower molecular weight. It will be derived from ethylene and, optionally, minor amounts of any of the comonomers listed above for the first polyethylene. The density can be from a lower limit of 0.945 or 0.950 or 0.955 g/cm³ to an upper limit of 0.975 or 0.970 or 0.965 g/cm³, with ranges from any lower limit to any upper limit being contemplated. The lower molecular weight is shown by a melt index $I_{2.16}$ as measured according to ASTM D1238, condition 190° C., 2.16 kg, of from 10 to 150 g/10 min. This molecular weight range is approximately equivalent to an intrinsic viscosity (in decalin at 135° C.) of from about 0.9 to about 1.2 dl/g. The melt index $I_{2.16}$ of the second polyethylene can range from a lower limit of 10 or 12 or 14 g/10 min to an upper limit of 150 or 100 or 50 or 30 g/10 min, with ranges from any lower limit to any upper limit being contemplated.

Industrial methods of producing the polyethylene components of the invention are well known in the art as is exemplified in the references cited above. Any such method capable of producing polyethylene polymer components according to the invention will be suitable. Such methods include gas phase, liquid phase (or solution), and slurry phase polymerization processes, either alone or in combination. By alone, reference is made to series or serial production in a single reactor or in more than one reactor. Reactor blends will also be suitable, such as by the use of mixed catalysts or mixed polymerization conditions in a single reactor. Gas phase processes are particularly suited in view of economic advantages. Such processes use supported catalysts and are conducted in polymerization reactors under gas phase conditions suitable for linear low density ethylene copolymers prepared by coordination polymerization. Illustrative examples may be found in U.S. Pat. Nos. 4,543,399; 4,588,790; 5,028,670; 5,352,749; 5,382,638; 5,405,922; 5,422,999; 5,436,304; 5,453,471; 5,462,999 and 5,463,999; and International applications WO 94/28032; WO 95/07942 and WO 96/00245. These processes use either traditional Ziegler-Natta catalysts or later organometallic catalysts characterized as having essentially single polymerization sites due to the arrangement of ancillary ligands on or about the metal center. Metallocene catalysts are representative "single site catalysts" and are preferred in this invention for their ability to produce narrow molecular weight distribution polyolefins.

Typically, the processes are conducted at temperatures of from about ⁻100° C. to 150° C., more typically from about 40° C. to 120° C., at pressures up to about 7000 kPa, typically from about 690 kPa to 2415 kPa. Continuous processes using fluidized beds and recycle streams as the fluidizing medium are preferred.

Slurry polymerization processes are suitable for both components and particularly suited for the high density components of the invention. These processes are typically described as those in which the polymerization medium can be either a liquid monomer, like propylene, or a hydrocarbon solvent or diluent, advantageously aliphatic paraffin such as propane, isobutane, hexane, heptane, cyclohexane, etc., or an aromatic one such as toluene. Slurry solids typically include the forming polymer and inert carrier-supported catalysts. Catalysts are typically Ziegler-Natta, and/or one or more single site catalysts, such as metallocenes. The polymerization temperatures may be those considered low, e.g., less than 50° C., typically 0° C.-30° C., or may be in a higher range, such as up to about 150° C., typically from 50° C. up to about 80° C., or at any ranges between the end points indicated. Pressures can vary from about 100 to about 700 psia (0.76-4.8 MPa). Additional description is given in U.S. Pat. Nos. 4,182,810; 5,274,056; 6,319,997; 6,380,325; 6,420,497; WO 94/21962; and WO 99/32531.

The polyethylene blend compositions in accordance with the present invention can include the first polyethylene in an amount of from a lower limit of 20 or 35 or 45 wt % to an upper limit of 80 or 65 or 55 wt %, based on the total weight of the first and second polyethylenes, with ranges from any lower limit to any upper limit being contemplated. Similarly, the polyethylene blend compositions in accordance with the present invention can include the second polyethylene in an amount of from a lower limit of 20 or 35 or 45 wt % to an upper limit of 80 or 65 or 55 wt %, based on the total weight of the first and second polyethylenes, with ranges from any lower limit to any upper limit being contemplated.

Additionally, either or both of the first polyethylene and the second polyethylene can be a sub-blend of two or more polyethylenes so long as the sub-blend has the properties described herein.

Although the description herein focuses on first and second polyethylenes, in some embodiments, the polyethylene blend composition can further include additional polymeric components, including additional polyethylenes, provided that the overall blend composition has the recited properties.

The weight percentages recited herein for the first and second polyethylene components are based on the total weight (100%) of the first and second polyethylene components.

The blend can have a density of from a lower limit of 0.930 or 0.932 or 0.935 g/cm³ to an upper limit of 0.955 or 0.950 or 0.945 g/cm³, with ranges from any lower limit to any upper limit being contemplated.

The blend can have a difference in the density of the first and second polyethylenes of from a lower limit of 0.030 or 0.032 or 0.035 g/cm³ to an upper limit of 0.048 or 0.045 or 0.042 g/cm³, with ranges from any lower limit to any upper limit being contemplated.

The melt index of the blend can be from a lower limit of 1.5 or 2.0 g/10 min to an upper limit of 12 or 10 or 8 g/10 min.

Polyethylene blend compositions of the invention show ESCR values of greater than 250 or greater than 500 or greater than 750 or greater than 1000 hr.

Polyethylene blend compositions of the invention show Notched Izod Impact values (−40° C., 3.17 mm thick sample) of greater than 120 kJ/m.

Additives may be used as needed. Typical additives include one or more of antioxidants, anti-static agents, UV stabilizers, foaming agents, processing aids, nucleating agents, nanocomposites, fiber reinforcements, and pigments. Illustrative pigments or colorants include titanium dioxide, carbon black, cobalt aluminum oxides such as cobalt blue, and chromium oxides such as chromium oxide green, and pigments such as ultramarine blue, which is a silicate. Phthalocyanine blue and iron oxide red will also be suitable. Such are typically used in amounts from 0 wt % to not more than about 15 wt %, based on the total weight of the first and second polyethylene components.

In accordance with the invention, a polyolefin-based, resin blend as previously described, is rotomolded. To this end, the resins, with or without additives, may be extrusion blended, pelletized and ground to a powder, typically of 35 U.S. mesh (500 µm) which means that the average particle size is typically 60 U.S. mesh (250 µm). The resins are also suitable for use in micro-pellet form with sizes typically 0.012 to 0.020 inch diameter. A suitable extrusion blending temperature is typically about 190 to 210° C. Thereafter, the powder is placed inside a hollow mold, which is typically rotated on two axes and heated inside an oven. The powder is heated for a sufficient time and at a temperature adequate to melt the thermoplastic constituents of the powder blend, during the rotomolding. The time and temperature used depend upon factors including the thickness of the part being rotomolded and thermal sensitivity of the constituents, and one skilled in the art can readily determine suitable processing conditions. As applied to the polyethylene resin blends of the invention, a part thickness of about 1/8" (0.3175 cm) to about 1/4" (0.635 cm), an oven temperature setting ranging from about 480° F. to 660° F. (250 to 350° C.) for about 10 to 25 minutes will typically provide sufficient melting conditions.

EXAMPLES

Notched IZOD tests were conducted in accordance with ASTM D-256, Method A.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975), pp. 287-368; Rodriguez, F., *Principles of Polymer Systems* 3rd ed., Hemisphere Pub. Corp., NY, (1989), pp. 155-160; U.S. Pat. No. 4,540,753; Verstrate et al., *Macromolecules*, vol. 21, (1988), pg. 3360; and references cited therein.

Environmental Stress Crack Resistance (ESCR) (bent strip) is determined in accordance with ASTM D 1693 run under variation conditions noted in the data. All tests used Igepal™ which is a nonylphenoxy poly(ethylenoxy)ethanol surfactant available from Rhone Polenc, Cranbury, N.J. All ESCR values cited herein are ASTM D 1693 F50 values, and are given in units of hours.

Polymer density (g/cm$^3$) is determined using a compression molded sample, cooled at 15° C. per minute and conditioned for 40 hours at room temperature according to ASTM D1505-68 and ASTM D4703 Annex A1 Procedure C.

Polymer melt flow rates can be determined at 190° C. according to ASTM D-1238. $I_{21.6}$ is the "flow index" or melt flow rate of the polymer measured according to ASTM D-1238, condition 190° C., 21.6 kg, and $I_{2.16}$ is the "melt index" or melt flow rate of the polymer measured according to ASTM D-1238, condition 190° C., 2.16 kg. The ratio of $I_{21.6}$ to $I_{2.16}$ is the "melt flow ratio" or "MFR". The melt flow rate $I_{21.6}$ is also sometimes termed the "high load melt index" or HLMI. Melt flow rates are reported in units of grams per 10 minutes (g/10 min) or equivalently decigrams per minute (dg/min).

Examples 1-3, Comparative Examples 1-5

The examples shown in Table 1 were prepared generally in accordance with the examples in U.S. Pat. No. 5,382,631, except where noted. A zirconocene activated with alumoxane on a silica support, 12 wt % methylalumoxane and 3.5 wt % zirconium, was used as polymerization catalyst in a gas phase reactor operated at about 185° F. (85° C.), with a gas phase consisting of 70 vol % ethylene, 0.5-2.0 vol % hexene, 200-800 parts per million hydrogen, with remainder being nitrogen. From about 50 to 75 pounds (22.6 to 33.9 kg) per hour were produced in each polymerization run.

Table 1 illustrates the invention in examples 1a-1b through 3a-3b, with comparative examples Comp 1 through Comp 5a-5b. Each "a" row illustrates a first polyethylene component and each "b" row illustrates a second polyethylene component. The column "Δ density" provides the difference in density of the two components for each illustrated blend. Comp 1 illustrates a comparative single polyethylene component within the density and melt index range typical for rotomolding compositions. Comp 2 illustrates a comparative blend where the melt indexes of the two components are approximately equal and the densities are such that the difference is less than 0.030 g/cm$^3$ but the average is the same as that of Comp 1. Comp 3 illustrates a comparative blend where the high molecular weight first and low molecular weight second polyethylenes each have the same density as Comp 1. Comp 4 illustrates a comparative blend where densities are the same but the molecular weight of the high molecular weight fraction and the blend composition have been increased. Comp 5 illustrates a comparative blend where the high molecular weight first polyethylene component has a density below 0.910 g/cm$^3$. As is readily apparent, the invention examples each have excellent ESCR and the comparative examples each do not. All samples were prepared by compression molding using standard conditions laid out under ASTM D4703 Annex A1 Procedure C. All ESCR values were run under ASTM D-1693 Cond B, 10% Igepal with F50 values reported in hours.

TABLE 1

| Example | Wt % | Melt Index $I_{2.16}$ (g/10 min) | Density (g/cm³) | Δ density (g/cm³) | Mw/Mn | ESCR, $F_{50}$ (hr), Cond B, 10% Igepal |
|---|---|---|---|---|---|---|
| 1a | 48.4 | 0.86 | 0.919 | | 2.43 | |
| 1b | 51.6 | 14.0 | 0.950 | | 3.34 | |
| 1a/1b Blend | 100 | 2.7 | 0.935 | 0.031 | | >1000 |
| 2a | 45 | 0.86 | 0.919 | | 2.43 | |
| 2b | 55 | 14.0 | 0.950 | | 3.34 | |
| 2a/2b Blend | 100 | 3.1 | 0.936 | 0.031 | | >1000 |
| 3a | 38.5 | 0.46 | 0.911 | | 2.50 | |
| 3b | 61.5 | 14.0 | 0.950 | | 3.34 | |
| 3a/3b Blend | 100 | 2.9 | 0.935 | 0.039 | | >1000 |
| Comp 1 | 100 | 3.05 | 0.935 | | 2.82 | <220 |
| Comp 2a | 55.5 | 3.0 | 0.947 | | 2.87 | |
| Comp 2b | 45.5 | 2.88 | 0.920 | | 2.43 | |
| Comp 2a/2b Blend | 100 | 3.0 | 0.935 | 0.027 | | <180 |
| Comp 3a | 58 | 0.97 | 0.934 | | 2.93 | |
| Comp 3b | 42 | 14 | 0.934 | | 2.58 | |
| Comp 3a/3b Blend | 100 | 3.0 | 0.934 | 0 | | <250 |
| Comp 4a | 48 | 3.0 | 0.935 | | 2.82 | |
| Comp 4b | 52 | 14 | 0.934 | | 2.58 | |
| Comp 4a/4b Blend | 100 | 7.6 | 0.935 | 0.01 | | <100 |
| Comp 5a* | 30 | 1.2 | 0.900 | | 2.0 | |
| Comp 5b | 70 | 14 | 0.950 | | 3.34 | |
| Comp 5a/5b Blend | 100 | 7.6 | 0.935 | 0.050 | | <100 |

*Commercial ethylene-based hexene plastomer (Exact™ 3132, ExxonMobil Chemical Company)

As further illustrated in FIG. 1, Comparative example 5a-5b (dotted line) exhibits dual melting temperatures by DSC, at 95.9° C. and 127.7° C. Invention example 3a-3b (solid line) exhibits a single melting temperature at 128.4° C. Both of these compared examples have the same density, indicative of essentially equivalent average comonomer content, yet cocrystallization is effectively achieved only with the invention blend.

Examples 4-5, Comparative Example 6

The examples 4 and 5 of Table 2 were prepared by melt blending two selected components in accordance with the invention. Rotational molded parts of the blends were prepared by grinding the polymer blends to 35 US mesh size and rotational molding at 345° C. in an FSP Model 60 clamshell rotational molding machine. Parts were cut from optimum produced rotational molded material for Izod testing. Optimum was determined by the material having no bubbles in the cross-section of the material when cut with a knife. This is a well known technique to those skilled in the art. Samples for ESCR testing were prepared by compression molding as per ASTM D4703 Annex A1 Procedure C. ESCR ASTM D-1693 was determined in accordance with Cond A, 10% Igepal. The high molecular weight first polyethylene used was a commercial film grade ethylene-based hexene copolymer (Exceed™ 1023CA, ExxonMobil Chemical Company) and the low molecular weight second polyethylene was produced in an ExxonMobil Chemical commercial slurry loop reactor utilizing a silica supported zirconocene activated with methylalumoxane polymerization catalyst under conditions used to produce high density polyethylene. The blend and comparative examples of Table 2 additionally included approximately equivalent amounts of additives: Irganox™ 3114 primary antioxidant (CIBA); Irgafos™ 168 secondary antioxidant (CIBA); and acid neutralizer (zinc stearate, or equivalent). The density, melt index $I_{2.16}$ and Mw/Mn of both are shown below. Comp 6 is a comparative example illustrating the properties of a commercial single component LLDPE resin sold for rotational molding use and described as having excellent ESCR and toughness. Examples 4 and 5 additionally exhibited low High Load Melt Indexes, $I_{21.6}$, ASTM-D 1238 (190° C., 21.6 kg) of 17.9 each as compared to the Comp 6 sample value of 82.5.

As can be seen in Table 2, both the ESCR and Notched Izod properties show significant improvements over the comparison composition. The ESCR values for invention examples 4 and 5 were initially determined to be greater than 288 hours when testing was stopped at 288 hours. Additional testing stopped at 1,000 hours confirmed that ESCR values were greater than 1,000 as reported in Table 2. Additional data obtained indicated that the invention blends of Table 2 exhibited surprisingly improved ARM (drop weight) impact strength, flexural modulus and tensile break stress as compared to the comparison composition.

TABLE 2

| Example | Wt % | Melt Index $I_{2.16}$ (g/10 min) | Density (g/cm³) | Δ density (g/cm³) | Mw/Mn | ESCR, $F_{50}$ (hr), Cond A 10% Igepal | Notched Izod, −40° C. (ft-lb/in) (J/m) 3.17 mm** | 6.35 mm** |
|---|---|---|---|---|---|---|---|---|
| 4a | 55 | 1.0 | 0.923 | | 2.9 | | | |
| 4b | 45 | 21.2 | 0.958 | | 2.7 | | | |
| 4a/4b Blend | 100 | 3.0 | 0.939 | 0.035 | 3.2 | >1,000 | 2.58 (137.8) | 1.62 (86.5) |

TABLE 2-continued

| Example | Wt % | Melt Index $I_{2.16}$ (g/10 min) | Density (g/cm³) | Δ density (g/cm³) | Mw/Mn | ESCR, $F_{50}$ (hr), Cond A 10% Igepal | Notched Izod, −40° C. (ft-lb/in) (J/m) 3.17 mm** | 6.35 mm** |
|---|---|---|---|---|---|---|---|---|
| 5a | 45 | 1.0 | 0.923 | | 2.9 | | | |
| 5b | 55 | 21.2 | 0.958 | | 2.7 | | | |
| 5a/5b Blend | 100 | 3.7 | 0.942 | 0.035 | 3.1 | >1,000 | 1.97 (105.2) | 1.5 (80.1) |
| Comp 6* | 100 | 3.3 | 0.939 | | 3.6 | 52 | 1.94 (103.6) | 1.20 (64.1) |

*Commercial LLDPE of ethylene and hexene (LL 8460, ExxonMobil Chemical Company)
**sample thickness It is observed that blends described herein may provide rotomolded articles having beneficial impact strength characteristics and ductile failure characteristics.

Such superior results are demonstrated by comparing the properties of molded articles produced from conventional polymeric materials and polymeric blends as described herein. Specially, the properties of molded articles produced from polymeric blends as described herein were compared with molded articles produced from a linear low density polyethylene produced using a hexene comonomer and commercially available from ExxonMobil Chemical Company under the designation LL8460 which is produced using Ziegler-Natta catalysis and has a melt index of 3.3 g/10 min and a density of 0.939 g/cm³.

Examples 7-12

Another control polymeric material compared to the blends described herein was commercially available from ExxonMobil Chemical Company under the designation LL6301. This linear low density polyethylene is produced with Ziegler-Natta catalysis incorporating a butene comonomer and has a melt index of 5 g/10 min and a density of 0.9355 g/cm³.

Table 3 sets forth the compositions of polymeric blends 7-12 used to produce rotomolded articles compared to rotomolded articles produced from the conventional polyethylene materials. The articles were produced in a rotational molding machine at an oven set point of 325° C. and oven times varying between 14 and 26 minutes or at 300° C. with oven times varying from 12 to 18.3 minutes to produce parts with nominal thicknesses of 0.125 inch (0.32 cm) and 0.25 inch (0.635 cm). The thickness of rotomolded parts may vary by +/−10% within a given sample because of the variable thickness control of rotational molding processes compared to more precise processes such as film production, injection molding, and other processes. For purposes of this disclosure, the term "nominal thickness" refers to the stated thickness value +/−10%. The roto-mold was made from 12 gauge 304 stainless steel. A water-based mold release was used to aid in part removal. The parts were cooled to ambient conditions using forced air fans and water sprays.

TABLE 3

(Compositions)

| | Example | | | | | |
|---|---|---|---|---|---|---|
| | 7 | 8 | 9 | 10 | 11 | 12 |
| Component 1 Density | 0.964 | 0.953 | 0.957 | 0.952 | 0.953 | 0.960 |
| Component 1 MI | 105 | 9.0 | 23 | 19 | 32 | 4.0 |
| Component 1 Mw | 34,200 | 67,200 | | | | |
| Component 2 Density | 0.919 | 0.913 | 0.922 | 0.922 | 0.918 | 0.918 |
| Component 2 MI | 0.7 | 0.7 | 0.8 | 0.8 | 1.1 | 4.5 |
| Component 2 Mw | 136,800 | 134,300 | | | | |
| Actual Density of Blend | 0.940 | 0.938 | 0.939 | 0.939 | 0.940 | 0.938 |
| Actual MI of Blend | 3.0 | 2.9 | 3.0 | 3.3 | 4.9 | 4.4 |
| Density Delta | 0.045 | 0.040 | 0.030 | 0.030 | 0.035 | 0.042 |
| Mw Ratio | 4:1 | 2:1 | 2.5:1 | 2.4:1 | 2.5:1 | 1:1 |
| Component Ratio | 45:55 | 65:35 | 50:50 | 44:56 | 40:60 | 50:50 |

Table 4 reports ESCR values for the control polymeric materials LL8460 and LL6301 and the polymeric blends of Examples 7-12. ESCR was determined on compression molded plaques using conditions outlined in ASTM D-1693.

TABLE 4

(ESCR Values)

| | MI (dg/min) | Density (g/cm³) | F50 10% Igepal Condition A | F50 100% Igepal Condition A |
|---|---|---|---|---|
| LL8460 Comparative | 3.4 | 0.939 | 50 hours | >1000 hours |
| LL6301 Comparative | 5.3 | 0.936 | 9 hours | 28 hours |
| Example 7 | 3.0 | 0.940 | >1000 hours | >1000 hours |
| Example 8 | 2.9 | 0.938 | >1000 hours | >1000 hours |
| Example 9 | 3.0 | 0.939 | >1000 hours | >1000 hours |
| Example 10 | 3.3 | 0.939 | >1000 hours | >1000 hours |
| Example 11 | 4.9 | 0.940 | 180 hours | >1000 hours |
| Example 12 | 4.4 | 0.938 | 322 hours | >1000 hours |

Table 5 reports various physical properties for the control polymeric materials LL8460 and LL6301 and the polymeric blends of Examples 7-12. To determine these properties, rotomolded articles were produced using the polymeric blends described herein and the conventional polymeric materials over a variety of cook times at 325° C. Samples for testing were die-cut from optimum cooked rotational molded parts. Parts conform to ASTM D-638 for tensile values and D-790 for flexural modulus and ASTM D-256 for Izods. Optimum was determined by the part having no bubbles in the cross-section of the part when cut with a knife. This is a well known technique to those skilled in the art. Part thickness for the values reported in Table 5 was 3 mm nominal thickness.

TABLE 5

(Physical Properties)

| | Flexural Modulus 1% Secant (kpsi) | Tensile Break Stress (psi) | Tensile Break Elongation (%) | Notched IZOD Impact @ −40° C. (ft-lb f/in) |
|---|---|---|---|---|
| LL 8460 | 95.5 | 1553 | 553 | 1.23 |
| LL 6301 | 91.8 | 874 | 236 | 1.14 |
| Example 7 | 92.9 | 1870 | 595 | 1.46 |
| Example 8 | 102.9 | 2616 | 809 | 1.60 |
| Example 9 | 110.6 | 1984 | 690 | 1.22 |
| Example 10 | 85.1 | 1632 | 667 | 1.23 |
| Example 11 | 109.3 | 1555 | 694 | 1.16 |
| Example 12 | 104.1 | 3070 | 987 | 1.28 |

The ARM impact strengths of various articles produced from the polymeric materials described herein were determined in accordance with the ARM impact procedures prescribed by the International Association of Rotational Molders located at 2000 Spring Rd., Suite 511, Oak Brook, Ill. 60523 USA. Additional information is also available at the website having the following address: www.rotomolding.org.

Additionally, ductile failure rates of the articles produced over varying cook times were determined. Ductility is defined by taking the total number of visually ductile failures and dividing it by the total number of failures as defined in the ARM impact procedure. A ductile sample exhibits major elongation around the impact site with the sample often remaining in one piece. A brittle sample fails with little elongation and generally results in several pieces being created.

In certain embodiments, the blends described herein may be used to produce rotomolded articles having an ARM impact value of at least 120 ft-lbs when the article is produced in a rotomolding process with at cook times of 14 to 18 minutes at about 250° C. to about 350° C. with part thicknesses of about 0.5 cm to about 1.3 cm. In other embodiments, the blends described herein may be used to produce rotomolded articles having an ARM impact value of at least 120 ft-lbs when the article is produced in a rotomolding process with at cook times of 14 to 18 minutes at about 250° C. to about 350° C. with part thicknesses of about 0.64 cm+/−10%.

In other embodiments, the blends described herein may be used to produce rotomolded articles having an ARM impact value of at least 50 ft-lbs when the article is produced in a rotomolding process with at cook times of 12 to 14 minutes at about 250° C. to about 350° C. with part thicknesses of about 0.2 cm to about 0.4 cm. In additional embodiments, the blends described herein may be used to produce rotomolded articles having an ARM impact value of at least 50 ft-lbs when the article is produced in a rotomolding process with at cook times of 12 to 14 minutes at about 250° C. to about 350° C. with part thicknesses of about 0.3 cm+/−10%. In certain embodiments, the blends described herein may be used to produce rotomolded articles having ductile failure rates of 90% to 100% when the article is produced in a rotomolding process with at cook times of 14 to 18 minutes at about 250° C. to about 350° C. with part thicknesses of about 0.5 cm to about 1.3 cm. In more embodiments, the blends described herein may be used to produce rotomolded articles having ductile failure rates of 90% to 100% when the article is produced in a rotomolding process with at cook times of 14 to 18 minutes at about 250° C. to about 350° C. with part thicknesses of about 0.64 cm+/−10%. In other embodiments, the blends described herein may be used to produce rotomolded articles having ductile failure rates of 90% to 100% when the article is produced in a rotomolding process with at cook times of 12 to 14 minutes at about 250° C. to about 350° C. with part thicknesses of about 0.2 cm to about 0.4 cm. In other embodiments, the blends described herein may be used to produce rotomolded articles having ductile failure rates of 90% to 100% when the article is produced in a rotomolding process with at cook times of 12 to 14 minutes at about 250° C. to about 350° C. with part thicknesses of about 0.32 cm+/−10%.

FIG. 2-FIG. 9 report the ARM impact strength values and the ductile failure rates for exemplary articles produced from the comparative polymeric materials and the various blends described herein produced as described above. In certain exemplary embodiments, as noted, the articles had nominal thicknesses of 0.32 cm. In other exemplary embodiments, as noted, the articles had nominal thicknesses of 0.64 cm. All 0.32 cm nominal thickness articles were produced at 300° C. oven temperatures and all 0.64 cm nominal thickness articles were produced at 325° C. oven temperatures.

Figure 2:
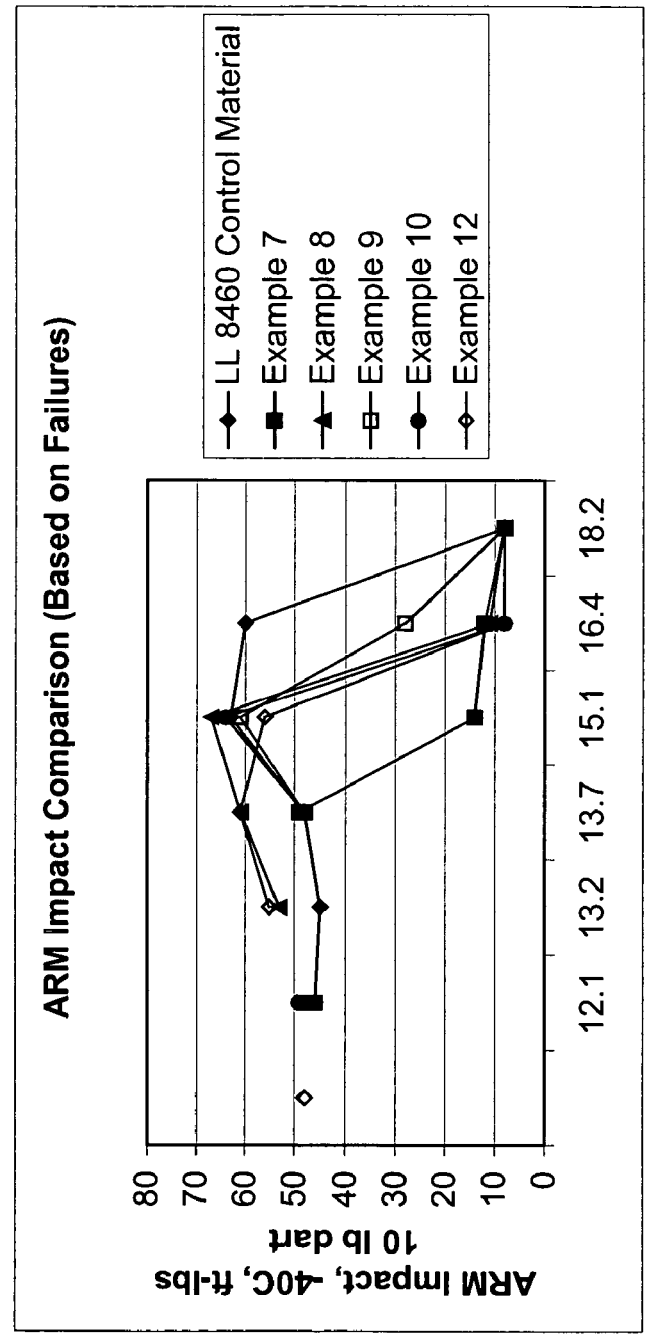
FIG. 2 reports ARM Impact strengths for articles produced from exemplary blends described herein.
Figure 3:
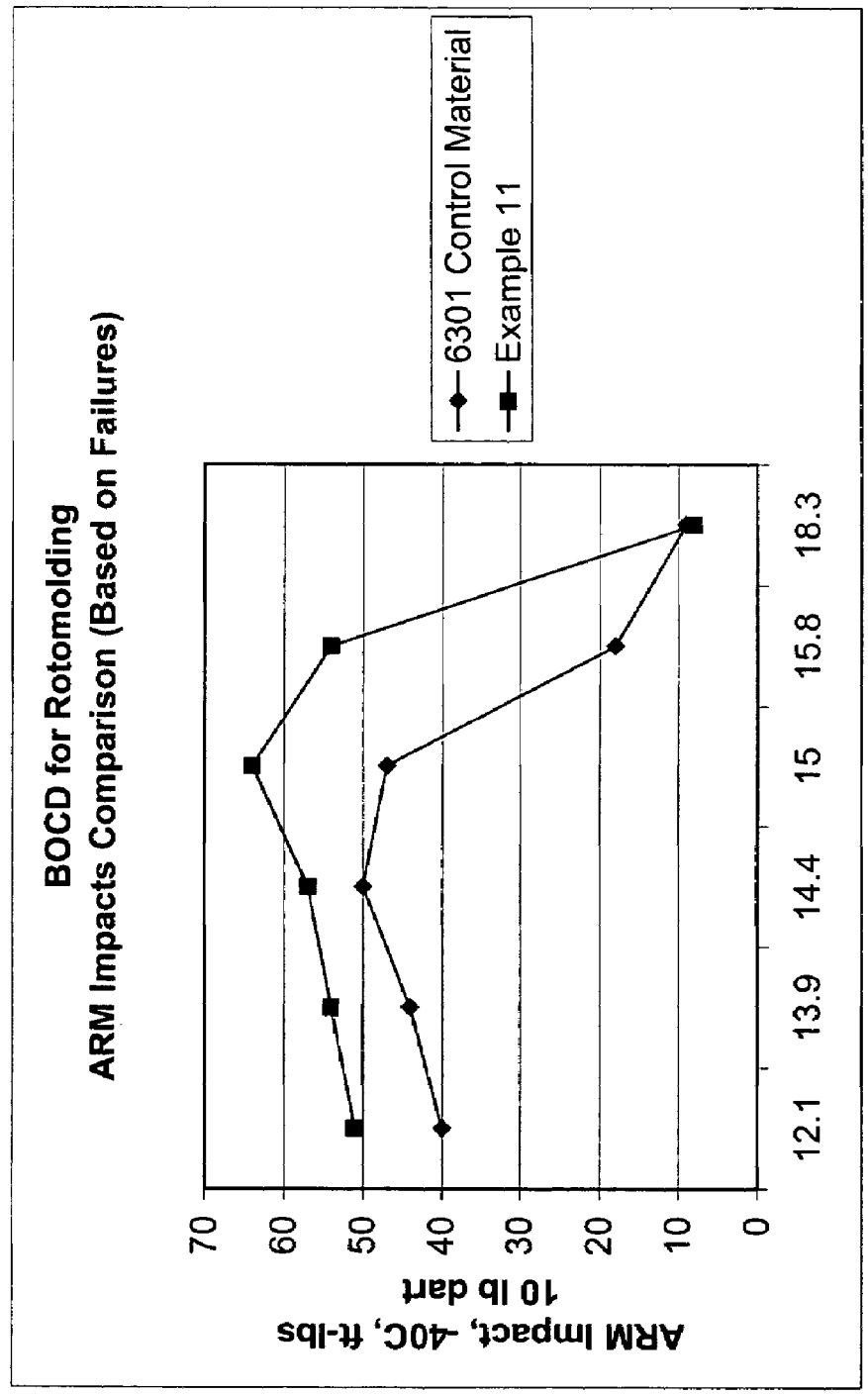
FIG. 3 reports ARM Impact strengths for articles produced from exemplary blends described herein.

With reference to FIG. 2 and FIG. 3, it is observed that in certain embodiments, the polymeric blends described herein are useful for producing 0.32 cm nominal thickness rotomolded articles having ARM impact values of at least 50 ft-lbs at cook times of less than 14 minutes at temperatures of about 300° C. In other embodiments, the polymeric blends described herein are useful for producing 0.32 cm nominal thickness rotomolded articles having ARM impact values of at least 55 ft-lbs at cook times of less than 14 minutes at about 300° C. In additional embodiments, the polymeric blends described herein are useful for producing 0.32 cm nominal thickness rotomolded articles having ARM impact values of at least 60 ft-lbs at cook times of less than 14 minutes at about 300° C.

Figure 4:
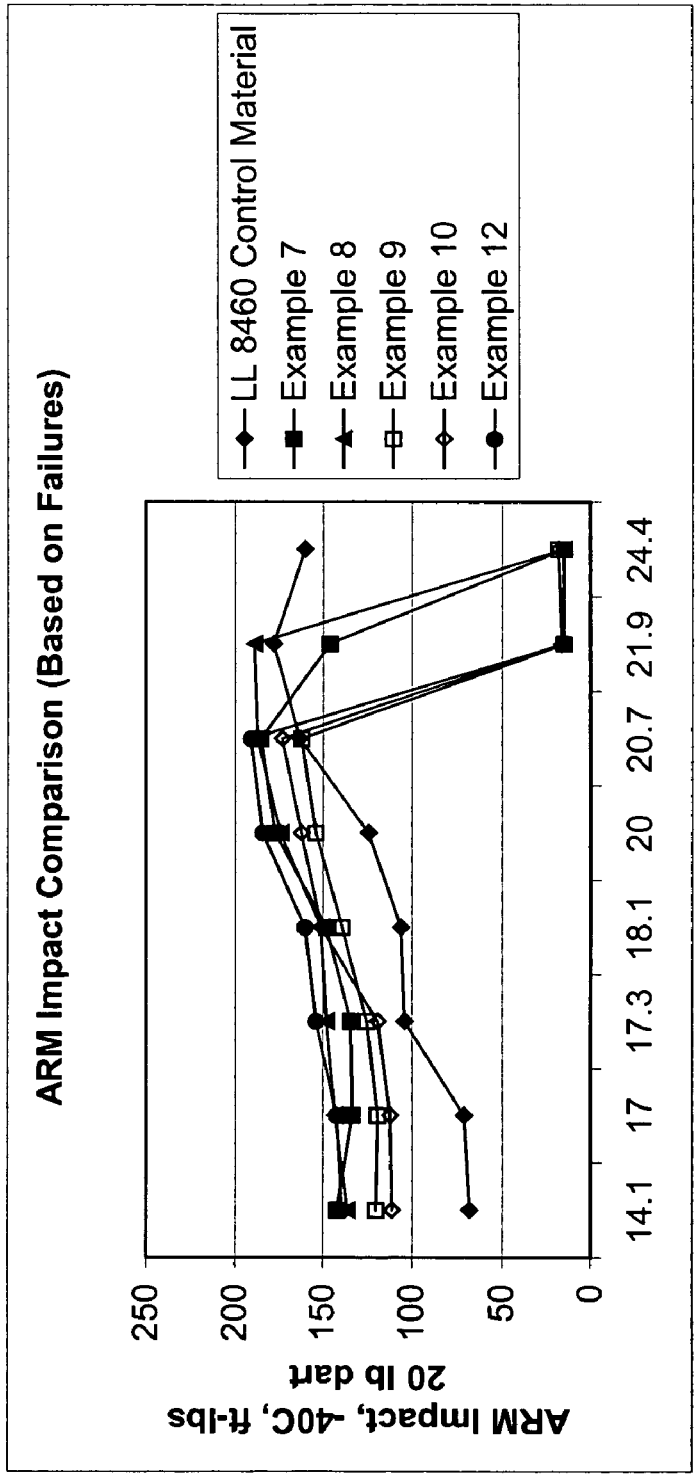
FIG. 4 reports ARM Impact strengths for articles produced from exemplary blends described herein.
Figure 5:
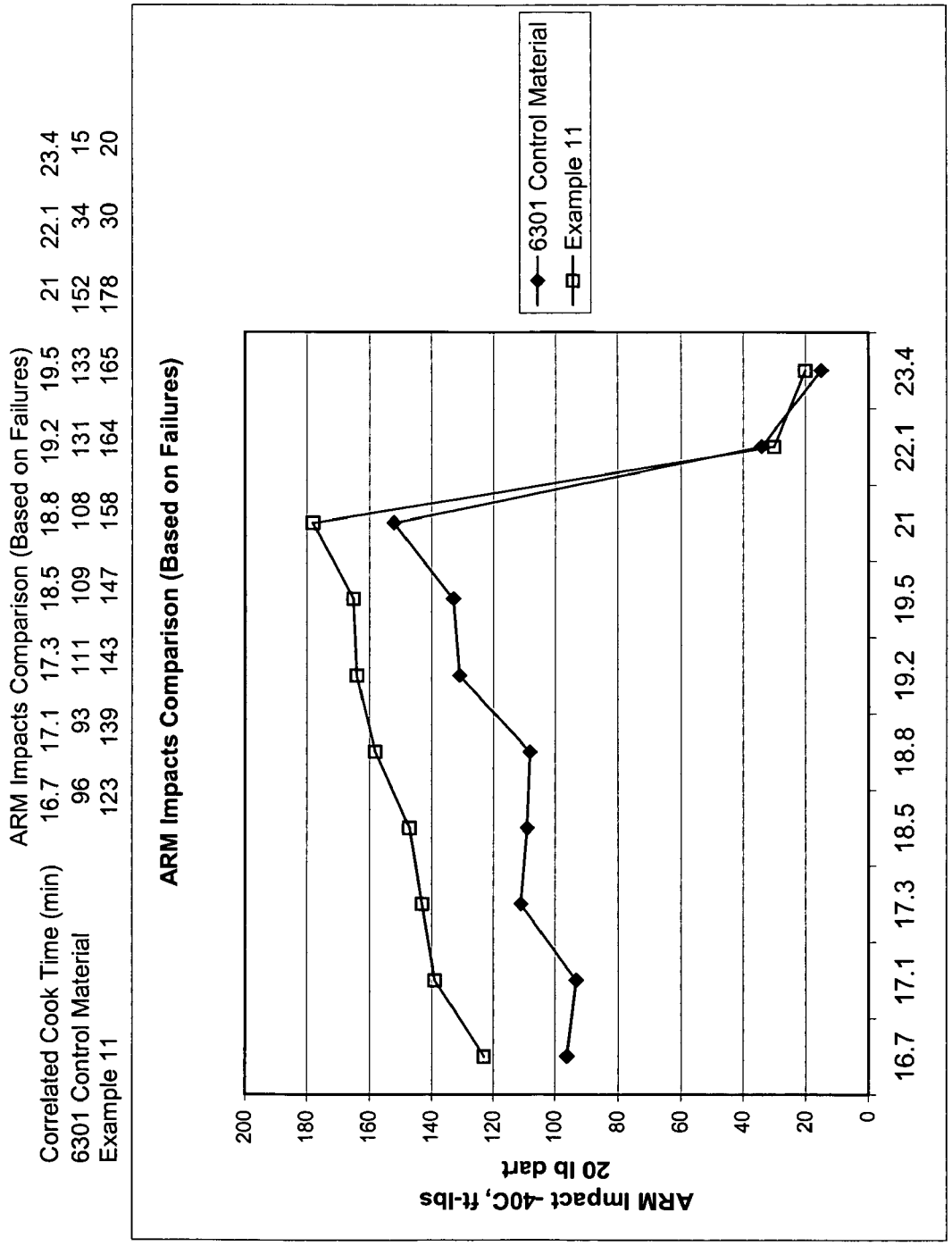
FIG. 5 reports ARM Impact strengths for articles produced from exemplary blends described herein.

With reference to FIG. 4 and FIG. 5, it is observed that in certain embodiments, the polymeric blends described herein are useful for producing 0.64 cm nominal thickness rotomolded articles having ARM impact values of at least 120 ft-lbs at cook times of less than 18 minutes at about 325° C. In other embodiments, the polymeric blends described herein are useful for producing 0.64 cm nominal thickness rotomolded articles having ARM impact values of at least 130 ft-lbs at cook times of about 14 minutes to about 18 minutes at about 325° C. In additional embodiments, the polymeric blends described herein are useful for producing 0.64 cm nominal thickness rotomolded articles having ARM impact values of at least 140 ft-lbs at cook times of about 14 minutes to about 18 minutes at about 325° C. In still other embodiments, the polymeric blends described herein are useful for producing 0.64 cm nominal thickness rotomolded articles having ARM impact values of at least 130 ft-lbs at cook times of about 14 minutes to about 17 minutes at about 325° C. In yet other embodiments, the polymeric blends described herein are useful for producing 0.64 cm nominal thickness rotomolded articles having ARM impact values of at least 150 ft-lbs at cook times of less than 20 minutes at about 325° C.

Figure 6:
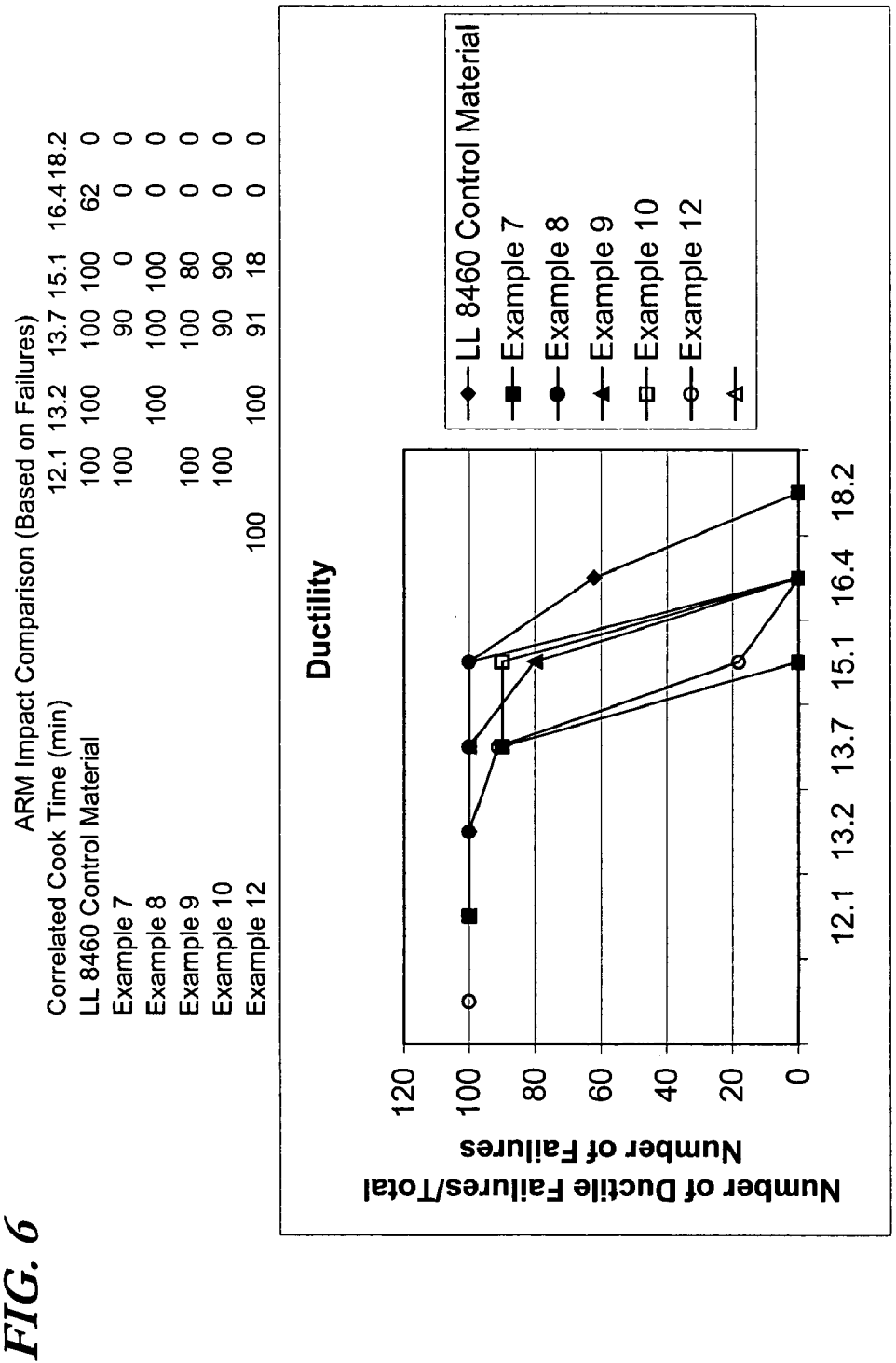
FIG. 6 reports ductile failure rates for articles produced from exemplary blends described herein.
Figure 7:
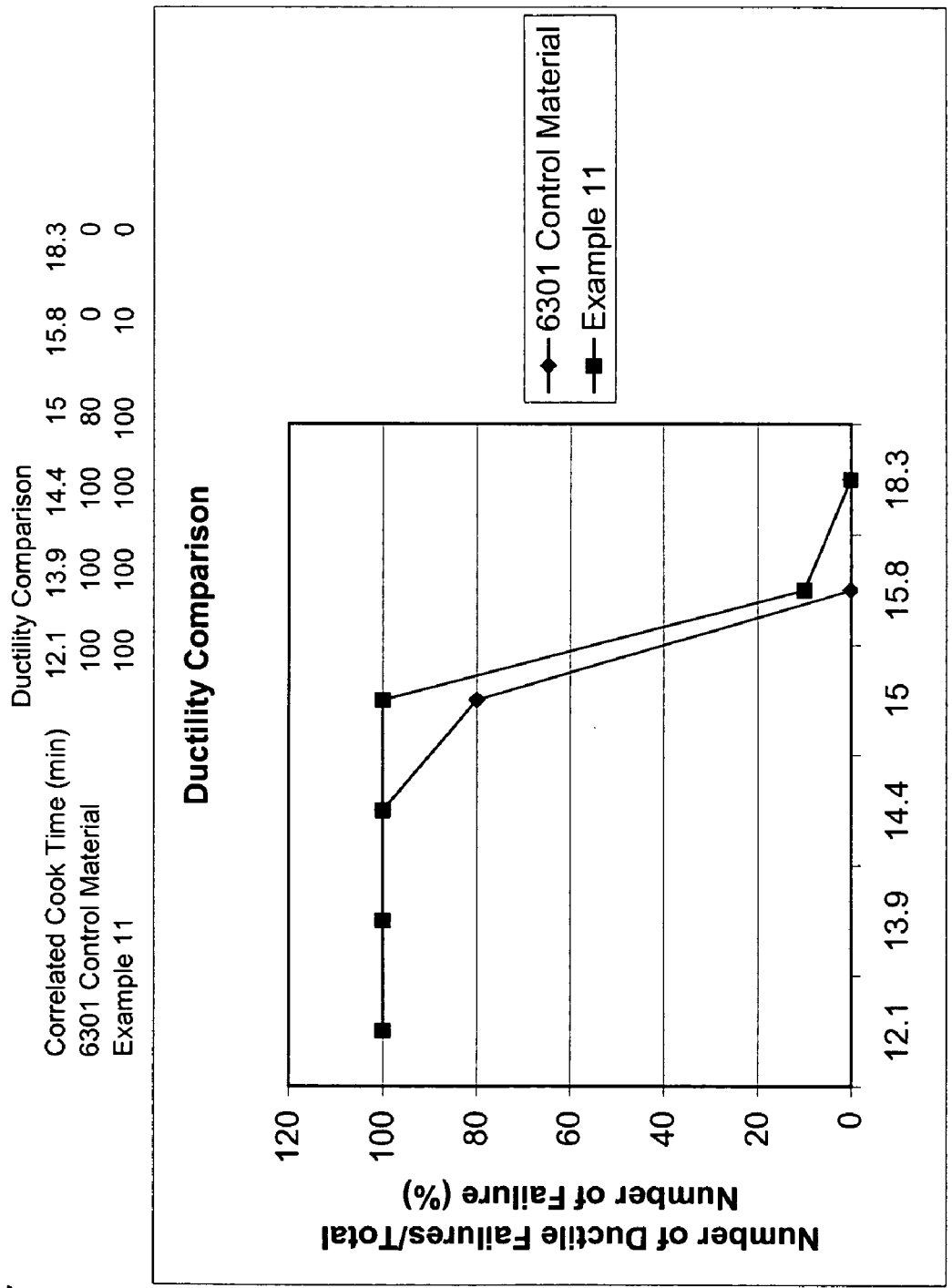
FIG. 7 reports ductile failure rates for articles produced from exemplary blends described herein.

With reference to FIG. 6 and FIG. 7, it is observed that in certain embodiments, the polymeric blends described herein are useful for producing 0.32 cm nominal thickness rotomolded articles exhibiting ductile failure rates of 90% at cook times of less than 14 minutes at about 300° C. In other embodiments, the polymeric blends described herein are useful for producing 0.32 cm nominal thickness rotomolded articles exhibiting ductile failure rates of 90% at cook times of about 12 minutes to about 14 minutes at about 300° C. In still other embodiments, the polymeric blends described herein are useful for producing 0.32 cm nominal thickness rotomolded articles exhibiting ductile failure rates of 90% at cook times of about 12 minutes to about 13 minutes at about 300° C.

Figure 8:
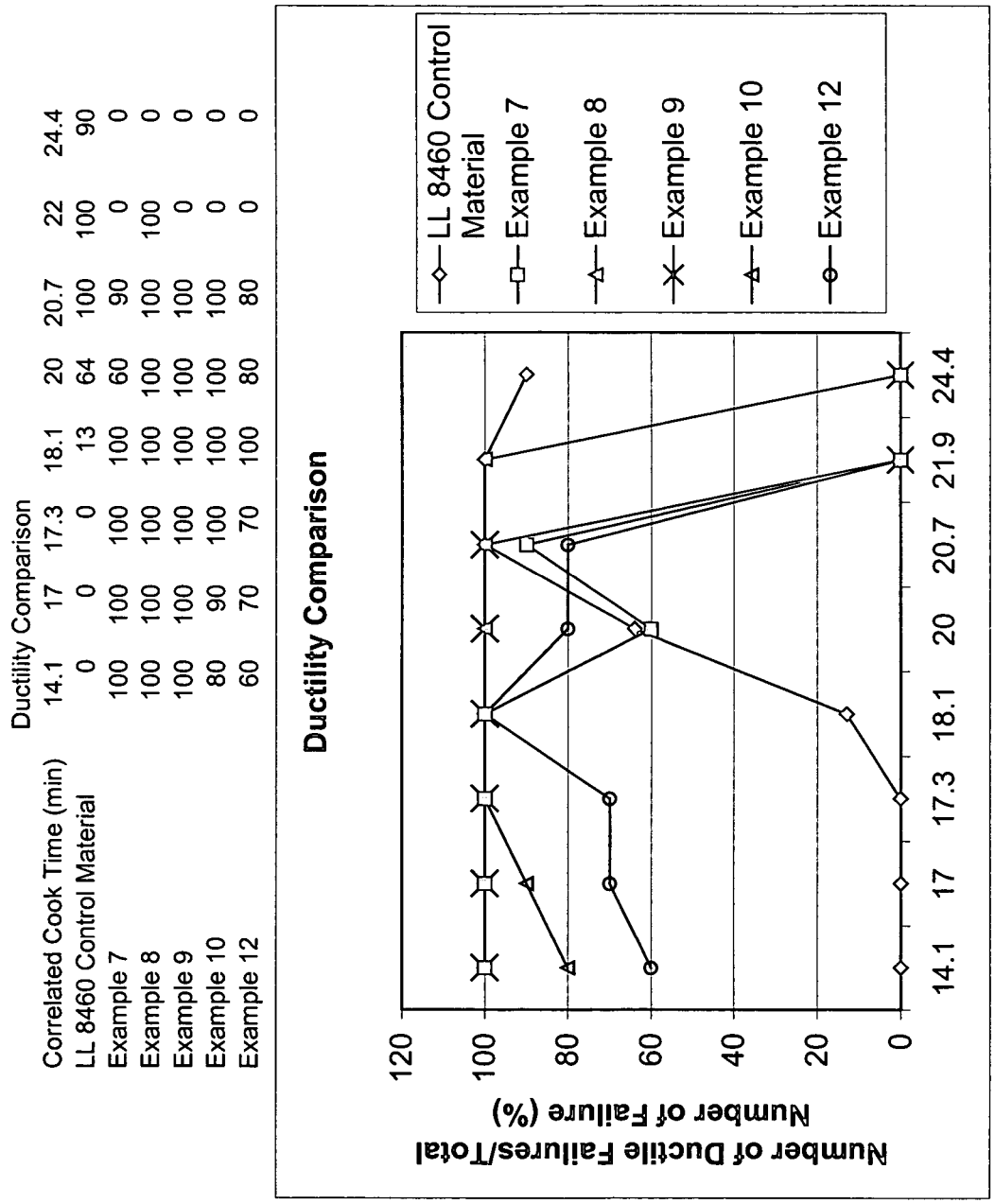
FIG. 8 reports ductile failure rates for articles produced from exemplary blends described herein.
Figure 9:
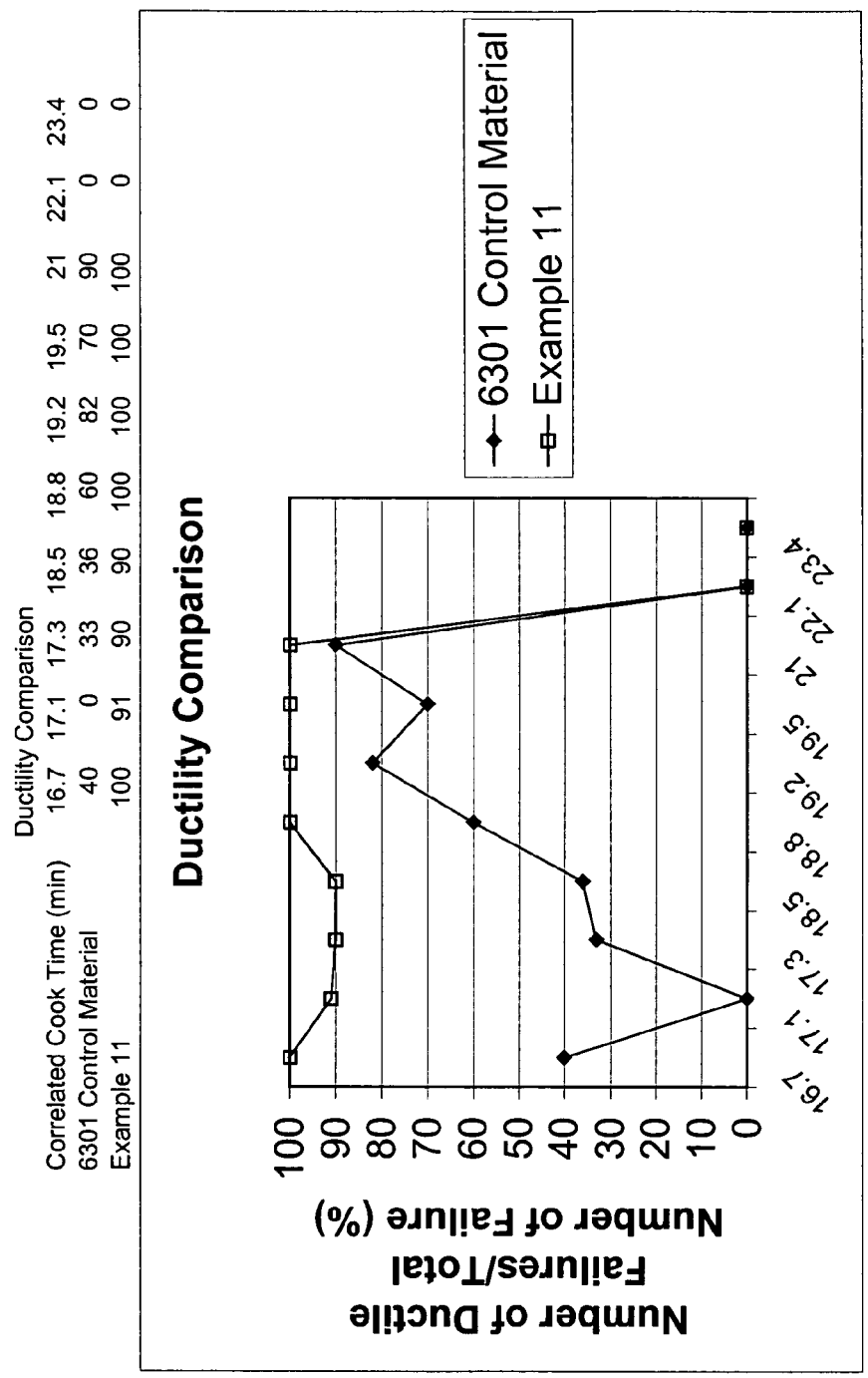
FIG. 9 reports ductile failure rates for articles produced from exemplary blends described herein.

With reference to FIG. 8 and FIG. 9, it is observed that in certain embodiments, the polymeric blends described herein are useful for producing 0.64 cm nominal thickness rotomolded articles exhibiting ductile failure rates of 90% at cook times of less than 20 minutes at about 325° C. In other embodiments, the polymeric blends described herein are useful for producing 0.64 cm nominal thickness rotomolded articles exhibiting ductile failure rates of 90% at cook times of about 14 minutes to about 18 minutes at about 325° C. In still other embodiments, the polymeric blends described herein are useful for producing 0.64 cm nominal thickness rotomolded articles exhibiting ductile failure rates of 70% at cook times of about 14 minutes to about 17 minutes at about 325° C. In additional embodiments, the polymeric blends described herein are useful for producing 0.64 cm nominal thickness rotomolded articles exhibiting ductile failure rates of 70% at cook times of about 14 minutes to about 17 minutes at about 325° C.

With additional reference to Tables 1, 2, and 4 above, it is seen that the polymeric blends described herein are useful for producing these beneficial impact strength and ductile failure characteristics while also exhibiting beneficial ESCR values as well. In certain embodiments, the ESCR values exhibited are greater than 1,000 hours.

A problem sometimes experienced with rotomolded article is failure of the polymeric material from which the article is produced. Such failures are most often experienced with rotomolded tanks at areas where fittings attach piping to the tanks. The failure mechanism is believed to be a combination of creep and fatigue of the polymeric material. It is believed that the material fatigue is caused by thermal expansion of the piping against the tank wall and fitting over a large number of cycles.

It is believed that the propensity of a material to experience such failure may be correlated to the deflection experienced by a polymeric material under a stress. Generally, the higher the deflection experienced by a polymeric material, the greater the propensity for the material to fail after a large number of expansion and contraction cycles.

To demonstrate this deflection, the deflection of rotomolded articles, samples were cut to form articles in the shape of flexural bars conforming to ASTM D-790 thus having a length of 12.7 cm, a width of 1.27 cm and a thickness of 0.64 cm under a measured stress was determined. Specifically, a 2.07 MPa stress level was placed on the surface of the articles maintained at a temperature of 23° C. Generally, the higher the measured deflection, the poorer the performance of the material tested. The various polymeric materials used to produce the rotomolded pads tested are as identified above.

In certain embodiments, the blends described herein may be used to produce rotomolded articles having a deflection of less than 0.8 cm after 20,000 cycles.

Figure 10:
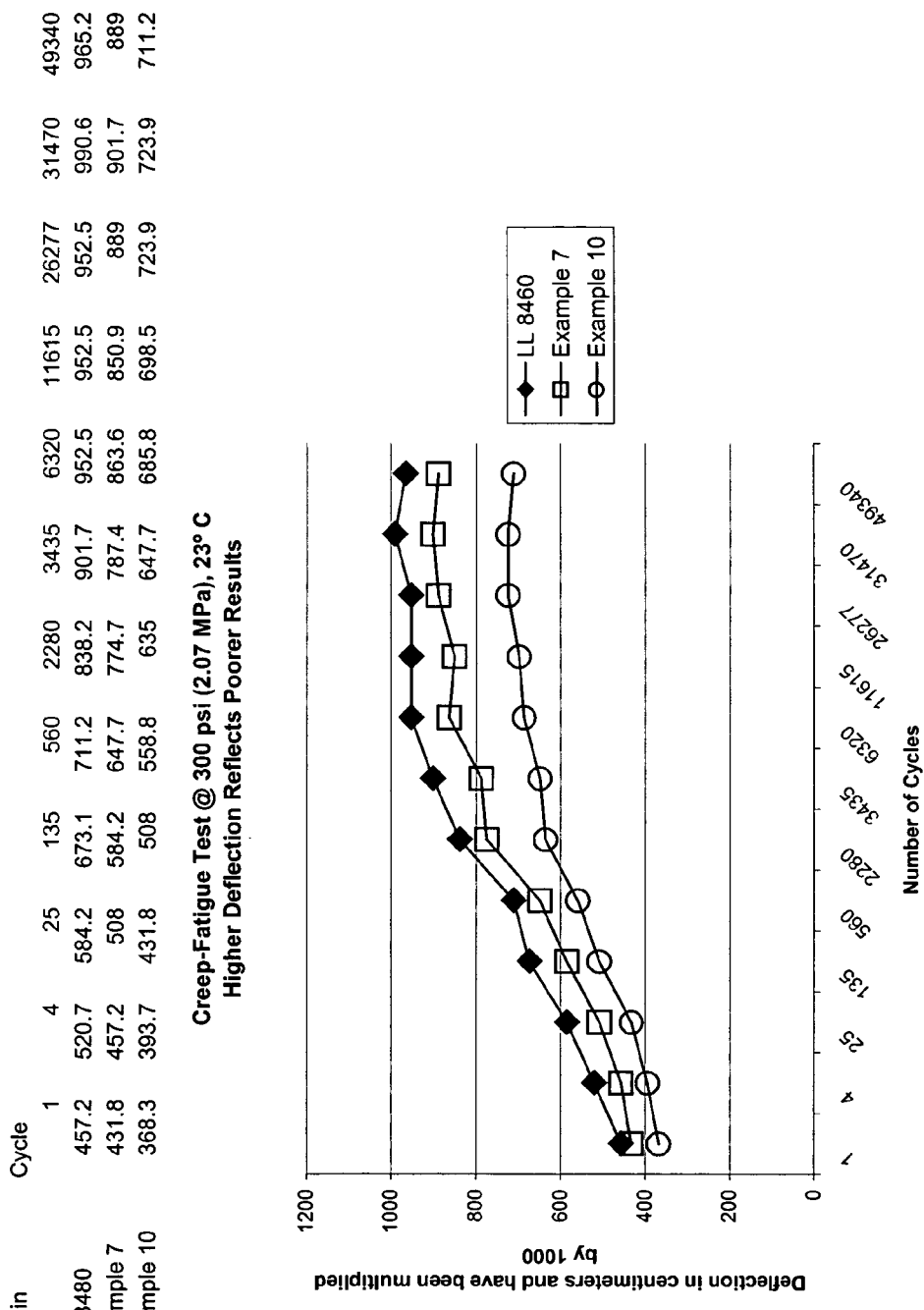
FIG. 10 reports deflection values for articles produced from exemplary blends described herein.

FIG. 10 reports of the deflection values for rotomolded articles produced from various polymeric materials. The article produced from comparative material LL 8460 was produced at a 22-minute oven cycle at 332° C., followed by fan air cool for 8 minutes and then a 12-minute water cool in a sheet steel mold. The articles of Examples 7 and 10 were made under the same rotational molding conditions previously described under the Examples 7-12. Specifically, FIG. 10 reports the deflections experienced by the articles in units of centimeters of deflection multiplied by 1,000. The data is reported both numerically and graphically. The various articles were tested over a large number of cycles as indicated in FIG. 10. Each sample was placed in a horizontal fashion with the weight being placed on the middle of the sample length. Each cycle lasted 2.5 minutes. The time period that the stress load was placed on the article changed over time because of creep or deflection of the article. As the sample deflects downward, the time the actual weight is on the sample decreases simulating the true fatigue-creep of plastics when repeated pushed a certain distance against plastics. In the initial testing period, the stress load was placed on the article for 1 minute, 15 seconds were required to raised the load, the load was then maintained in the raised position for 1 minute, and then the load was lowered over a 15 second interval. The fatigue component of the deflection of the polymeric material arises from the repetitions of the cycles which causes stress and relaxation of the samples. The creep component of the deflection of the polymeric material arises from compression of the polymeric material while it is under the stress load. The total of the fatigue and creep components is reflected by the increased deflection observed as the number of stress load cycles increases. For ease of reference, this total deflection result will be referred to as deflection of the material tested.

With reference to FIG. 10, it is seen that the Comparative polymeric material exhibited the best resistance to fatigue as evidenced by the lowest deflection value after high numbers of load cycles. However, this polymeric material does not exhibit beneficial ESCR properties as reported in Tables 2 and 4 above. However, the article produced from the polymeric material of Example 10, identified in Table 3 above, exhibits similar deflection values and also demonstrates superior ESCR properties as reported in Table 4 above.

Therefore, it is seen that the polymeric blends described herein may provide rotomolded articles exhibiting beneficial resistance to defection after high stress load cycles. The importance of choosing the density of the individual densities of the polymeric materials and delta in the densities of the component polymeric materials to obtain the most favorable properties is illustrated in by comparing the results of Example 10 with Example 7. Both blends have good impact and ESCR performance, but Example 10 also exhibits good deflection performance which may also be referred to as a combination of creep and fatigue.

Various tradenames used herein are indicated by a ™ symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

What is claimed is:

1. A process for making a polyethylene blend composition comprising:
blending (a) a first polyethylene having a melt index of 0.4 to 3.0 g/10 min and a density of from 0.910 to 0.930 g/cm$^3$ with a sufficient amount of (b) a second polyethylene having a melt index of 10 to 30 g/10 min and a density of 0.945 to 0.975 g/cm$^3$, to provide a polyethylene blend having:
a density of from 0.930 to 0.955 g/cm$^3$, a melt index of 1.5 to 12 g/10 min, an ESCR value of at least 250 hrs, and an Izod impact strength of at least 120 J/m, for a 3.17 mm sample at 40 C,
wherein the first and second polyethylenes differ in density by from 0.030 to 0.048 g/cm$^3$, and wherein at least one of the first and second polyethylenes is a metallocene-catalyzed polyethylene.

2. The process of claim 1, wherein the first and second polyethylenes are metallocene-catalyzed polyethylenes.

3. The process of claim 1, wherein each of the first and second polyethylenes has an Mw/Mn ratio of from 2.0 to 4.0.

4. The process of claim 3, wherein the Mw/Mn ratio is from 2.0 to 3.5.

5. The process of claim 1, wherein the first polyethylene has a density of from 0.911 to 0.926 g/cm$^3$.

6. The process of claim 1, wherein the second polyethylene has a density of from 0.950 to 0.970 g/cm$^3$.

7. The process of claim 1, wherein the second polyethylene has a density of from 0.955 to 0.965 g/cm$^3$.

8. The process of claim 1, wherein the composition has a density of from 0.932 to 0.950 g/cm$^3$.

9. The process of claim 1, wherein the composition has a density of from 0.935 to 0.945 g/cm$^3$.

10. The process of claim 1, wherein the first and second polyethylenes differ in density by from 0.032 to 0.045 g/cm$^3$.

11. The process of claim 1, wherein the composition has a melt index of from 2 to 10 g/10 min.

12. The process of claim 1, wherein the blend comprises 80% to 20% by weight of the first polyethylene and 20% to 80% by weight of the second polyethylene, based on the total weight of the first and second polyethylenes.

13. The process of claim 1, wherein the blend comprises 65% to 35% by weight of the first polyethylene and 35% to 65% by weight of the second polyethylene, based on the total weight of the first and second polyethylenes.

14. The process of claim 1, wherein the blend comprises 55% to 45% by weight of the first polyethylene and 45% to 55% by weight of the second polyethylene, based on the total weight of the first and second polyethylenes.

15. The process of claim 1, wherein the composition has an ESCR value of at least 288 hrs.

16. The process of claim 1, wherein the composition has an ESCR value of at least 500 hrs.

17. The process of claim 1, wherein the composition has an ESCR value of at least 750 hrs.

18. The process of claim 1, wherein the composition has an ESCR value of at least 1,000 hrs.

19. The process of claim 1, wherein the blend consists essentially of the first and second polyethylenes.

20. The process of claim 1, wherein at least one of the first and second polyethylenes comprises a blend of two or more polyethylene resins.

21. A process for forming a rotomolded article, the process comprising:
(a) blending (i) a first polyethylene having a melt index of 0.4 to 3.0 g/10 min and a density of from 0.910 to 0.930 g/cm$^3$ with a sufficient amount of (ii) a second polyethylene having a melt index of 10 to 30 g/10 min and a density of 0.950 to 0.975 g/cm$^3$ to provide a polyethylene blend having:
a density of from 0.930 to 0.955 g/cm$^3$; and a melt index of 1.5 to 12 g/10 min, an ESCR value of at least 250 hrs, and an Izod impact strength of at least 120 J/m, for a 3.17 mm sample at 40 C,
wherein the first and second polyethylenes differ in density by from 0.030 to 0.048 g/cm$^3$; and
(b) rotomolding the polyethylene blend to form a rotomolded article,
wherein at least one of the first and second polyethylenes is a metallocene-catalyzed polyethylene.

22. The process of claim 21, wherein the rotomolding process has a cook time of 14 minutes to 18 minutes at about 250° C. to about 350° C. and the article has an ARM impact value of at least 120 ft-lbs with a part thickness of about 0.5 cm to about 1.3 cm.

23. The process of claim 22, wherein the article has a ductile failure rate of at least 90%.

24. The process of claim 23, wherein the article has an ESCR value of greater than 1,000 hrs.

25. The process of claim 21, wherein the rotomolding process has a cook time of about 12 minutes to about 14 minutes at about 250° C. to about 350° C. and the article has an ARM impact value of at least 50 ft-lbs with a part thickness of about 0.2 cm to about 0.4 cm.

26. The process of claim 25, wherein the article has a ductile failure rate of at least 90%.

27. The process of claim 26, wherein the article has an ESCR value of greater than 1,000 hrs.

28. The process of claim 22, wherein the article has a deflection of less than 0.8 cm after 20,000 cycles.

29. The process of claim 24, wherein the article has a deflection of less than 0.8 cm after 20,000 cycles.

30. The process of claim 25, wherein the article has a deflection of less than 0.8 cm after 20,000 cycles.

31. The process of claim 27, wherein the article has a deflection of less than 0.8 cm after 20,000 cycles.

32. The process of claim 21, wherein the rotomolding process has a cook time of 14 minutes to 17 minutes at about 325° C. and the article has an ARM impact value of at least 130 ft-lbs with a nominal part thickness of about 0.64 cm.

33. The process of claim 32, wherein the article has a ductile failure rate of at least 90%.

34. The process of claim 33, wherein the article has an ESCR value of greater than 1,000 hrs.

35. The process of claim 34, wherein the article has a deflection of less than 0.8 cm after 20,000 cycles.

36. The process of claim 21, wherein the rotomolding process has a cook time of less than about 14 minutes at about 300° C. and the article has an ARM impact value of at least 55 ft-lbs with a nominal part thickness of about 0.32 cm.

37. The process of claim 36, wherein the article has a ductile failure rate of at least 90%.

38. The process of claim 37, wherein the article has an ESCR value of greater than 1,000 hrs.

39. The process of claim 38, wherein the article has a deflection of less than 0.8 cm after 20,000 cycles.

40. A process for making a polyethylene blend composition comprising:
blending (a) a first polyethylene having a density of from 0.912 to 0.923 g/cm$^3$ and a melt index of 0.4 to 4.5 g/10 min with a sufficient amount of (b) a second polyethylene having a melt index of 4 to 110 g/min and a density of from 0.950 to 0.965 g/cm$^3$, to provide a polyethylene blend having:

a density of from 0.938 to 0.940 g/cm$^3$, a melt index of from 2.5 to 5 g/10min, an ESCR value of at least 250 hrs, and an Izod impact strength of at least 120 J/m, for a 3.17 mm sample at 40 C, wherein the first and second polyethylenes differ in density by from 0.030 to 0.045 g/cm$^3$, and wherein at least one of the first and second polyethylenes is a metallocene-catalyzed polyethylene.

* * * * *